(12) United States Patent
deBretton Gordon

(10) Patent No.: US 11,160,402 B2
(45) Date of Patent: Nov. 2, 2021

(54) KNIFE BLOCK

(71) Applicant: Robert Welch Designs Ltd., Gloucestershire (GB)

(72) Inventor: Iain Paul deBretton Gordon, Shipston on Stour (GB)

(73) Assignee: Robert Welch Designs Ltd., Chipping Campden (GB)

( * ) Notice: Subject to any disclaimer, the term of this patent is extended or adjusted under 35 U.S.C. 154(b) by 65 days.

(21) Appl. No.: 16/778,908

(22) Filed: Jan. 31, 2020

(65) Prior Publication Data
US 2020/0253402 A1 Aug. 13, 2020

(30) Foreign Application Priority Data
Feb. 7, 2019 (GB) ..................................... 1901676

(51) Int. Cl.
*A47G 21/14* (2006.01)
*A47B 81/00* (2006.01)

(52) U.S. Cl.
CPC .............. *A47G 21/14* (2013.01); *A47B 81/00* (2013.01)

(58) Field of Classification Search
CPC ...... A47G 21/14; A47B 81/04; A47B 81/005; A47B 81/00
See application file for complete search history.

(56) References Cited

U.S. PATENT DOCUMENTS

| | | | | | |
|---|---|---|---|---|---|
| 1,569,508 | A | * | 1/1926 | Lee | A47G 21/14 248/37.6 |
| 1,937,424 | A | * | 11/1933 | Champlin | A47G 21/14 248/37.6 |
| 2,453,800 | A | * | 11/1948 | Lowell, Jr. | A47G 21/14 248/37.6 |
| 2,754,008 | A | * | 7/1956 | Culver | A47G 21/14 248/37.6 |
| D178,993 | S | * | 10/1956 | Georgan | D7/637 |
| 3,071,252 | A | * | 1/1963 | Hanschar | B25H 3/04 211/70.7 |

(Continued)

FOREIGN PATENT DOCUMENTS

| CN | 2850497 Y | 12/2006 |
|---|---|---|
| CN | 201675814 U | 12/2010 |

(Continued)

OTHER PUBLICATIONS

GB Combined Search and Examination Report, Application No. GB1901676.5, dated Jul. 17, 2019.

(Continued)

*Primary Examiner* — Stanton L Krycinski
(74) *Attorney, Agent, or Firm* — MacMillan, Sobanski & Todd, LLC

(57) ABSTRACT

A knife block for storing knives includes a body portion defining at least one slot having a closed end and an open end. A recess is defined in the body portion. The recess defines a ledge that is angled downwardly when the knife block is in the upright condition. The convex ledge engages concave surfaces on a bolster of knife to direct the knife against the closed end of slot when the knife is mounted in the slot. A wall extends from the closed end of slots. The wall defines a surface against which the handles of knives are supported when the knives are mounted in slots.

4 Claims, 3 Drawing Sheets

(56) References Cited

U.S. PATENT DOCUMENTS

| | | | |
|---|---|---|---|
| 4,537,315 A * | 8/1985 | Griffin | A47G 21/14 206/553 |
| 4,561,548 A | 12/1985 | Call | |
| 4,966,339 A | 10/1990 | Lu | |
| D572,982 S | 7/2008 | de Bretton Gordon | |
| 7,637,803 B2 | 12/2009 | Welch | |
| D657,634 S | 4/2012 | de Bretton Gordon | |
| D657,635 S | 4/2012 | de Bretton Gordon | |
| 8,721,403 B2 | 5/2014 | Welch | |
| D712,706 S | 9/2014 | de Bretton Gordon | |
| D779,893 S | 2/2017 | deBretton Gordon et al. | |
| D800,513 S * | 10/2017 | Liu | D7/637 |
| 10,251,500 B2 * | 4/2019 | Marcu | A47G 21/14 |
| 10,383,468 B2 * | 8/2019 | Kerulis | A47G 21/14 |
| D886,542 S | 6/2020 | deBretton Gordon | |
| D911,122 S | 2/2021 | deBretton Gordon | |
| 2006/0022094 A1 * | 2/2006 | Schmidt | A47G 21/14 248/37.3 |

FOREIGN PATENT DOCUMENTS

| | | | |
|---|---|---|---|
| CN | 202234995 U | 5/2012 | |
| DE | 3043421 A1 | 7/1982 | |
| DE | 29902474 U1 | 4/1999 | |
| EP | 3473140 A1 * | 4/2019 | A47G 21/14 |
| GB | 2133681 A | 8/1984 | |
| WO | 2019017807 A1 | 1/2019 | |

OTHER PUBLICATIONS

Extended European Search Report, Application No. 20153669.5, dated Jun. 8, 2020.

First Chinese Office Action, Application No. 202010081794.4, dated Jun. 3, 2021.

* cited by examiner

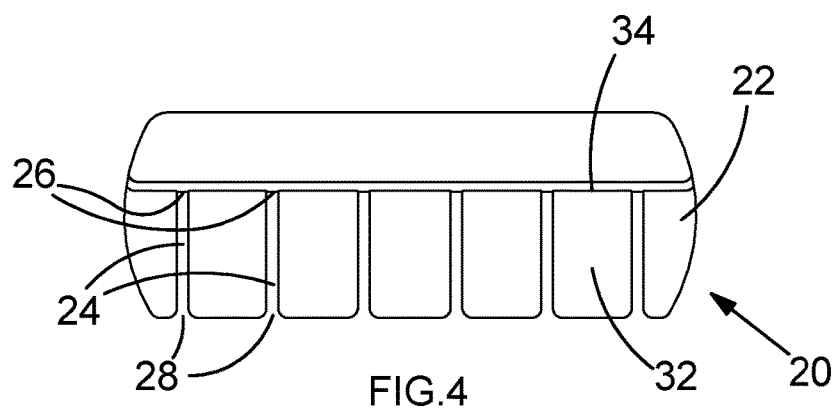
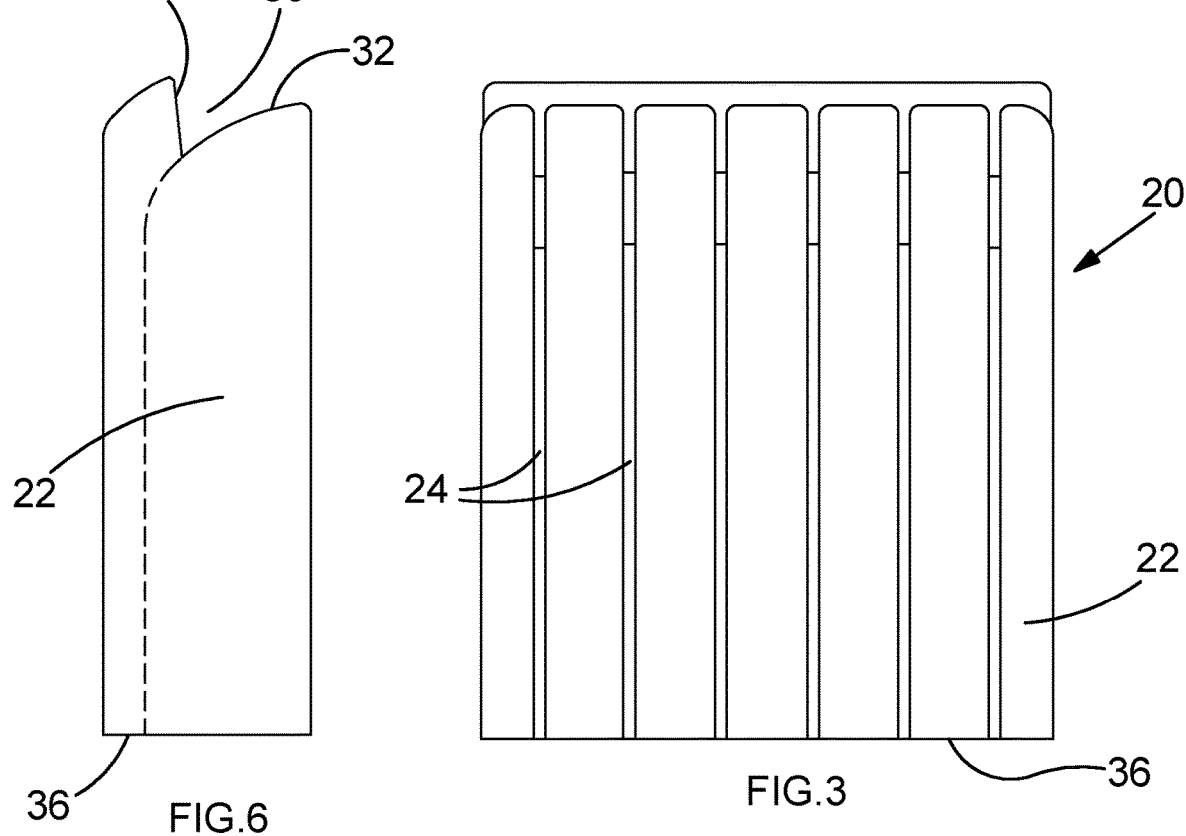
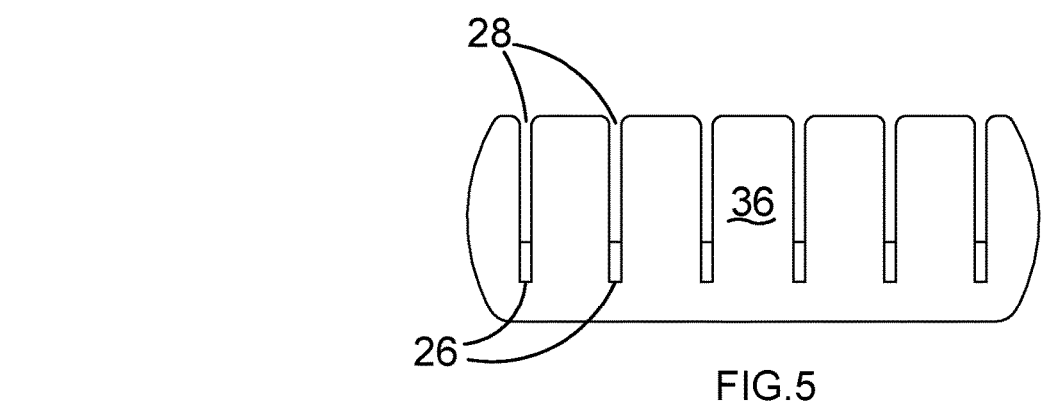

KNIFE BLOCK

BACKGROUND OF THE INVENTION

The present invention relates to a knife block for storing knives and relates particularly, but not exclusively, to an assembly comprising a knife block and knives.

Knife blocks are used to store a variety of different knives suitable for different kitchen uses. For example, a knife block might include one or more of a chef's knife, a utility knife, a santoku knife, a boning knife, a bread knife, a cleaver knife, and a paring knife, among others. Generally, the handles of the knives in the knife block and the knife block itself might share common stylization for aesthetic purposes.

Generally, knife blocks comprise a body portion in which slots are formed. The knife is usually dropped downwardly through an entrance to the slot on the upper face of the knife block such that the blade of the knife is completely enclosed.

It is desirable to provide an improved knife block to simplify mounting and withdrawal of knives, while also ensuring that when mounted in a block, the knives are securely held.

SUMMARY OF THE INVENTION

According to an aspect of the present invention, there is provided a knife block for storing knives. The knife block includes a body portion defining at least one slot for receiving a blade of a knife. The at least one slot has a closed end and an open end extending the whole length of the blade of a knife in use. A recess is provided in the body portion disposed adjacent a top end of the at least one slot. The recess includes a ledge defining a convex surface being angled downwardly when the knife block is in an upright condition to engage a bolster of a knife in use to direct the knife against the closed end of the at least one slot.

This provides the advantage of a knife block which facilitates mounting of a knife in a simplified manner since the slot is open at one end, which is generally vertical when the knife block is upright. This also provides the advantage of providing a positive feedback to a user that a knife is securely mounted because the ledge directs the knife into the recess and against the closed end of the slot. This further provides the advantage of simplifying the mounting of the knife in the block because the user does not have to place the point of a knife in an opening hole in the upper face of the block. The user can simply slide the whole blade into the open end of the slot.

In a preferred embodiment, the knife block further includes a wall portion extending from the closed end of the at least one slot, wherein the wall portion is configured to engage a handle of the knife when mounted in the knife block. This provides the advantage of supporting the handle to hold the knife in a more secure fashion.

In a preferred embodiment, the body portion further includes a base end on which the knife block is configured to stand, and wherein the open end of the at least one slot extends from the base end to the ledge. This provides the advantage of further simplifying the mounting of the knife in the block by increasing the length of the open end of the slot such that the user can initially place any part of the knife in the slot to mount the knife, rather than just the point.

The knife block may further include a plurality of slots for receiving a plurality of knives, each slot having a closed end and an open end.

According to another aspect of the present invention, there is provided an assembly that includes a knife block as defined above and at least one knife. This provides the advantage of an assembly which facilitates mounting of a knife in a block in a simplified manner because the slot is open at one end, which is generally vertical when the knife block is upright. This also provides the advantage of providing a positive feedback to a user that a knife is securely mounted because the ledge directs the knife into the recess and against the closed end of the slot.

In a preferred embodiment, the at least one knife includes at least one concave guide surface arranged to slidably engage the convex surface of the ledge. This provides the advantage that the knife guides itself into being mounted in the block when the concave guide surfaces engage the convex ledge.

Various aspects of this invention will become apparent to those skilled in the art from the following detailed description of the preferred embodiment, when read in light of the accompanying drawings.

BRIEF DESCRIPTION OF THE DRAWINGS

FIG. 3 is a front view of the knife block of FIG. 1.

FIG. 4 is a view of the top of the knife block of FIG. 1.

FIG. 5 is a view of the base of the knife block of FIG. 1.

FIG. 6 is a view from one side of the knife block of FIG. 1.

DETAILED DESCRIPTION OF THE PREFERRED EMBODIMENT

Figure 1:
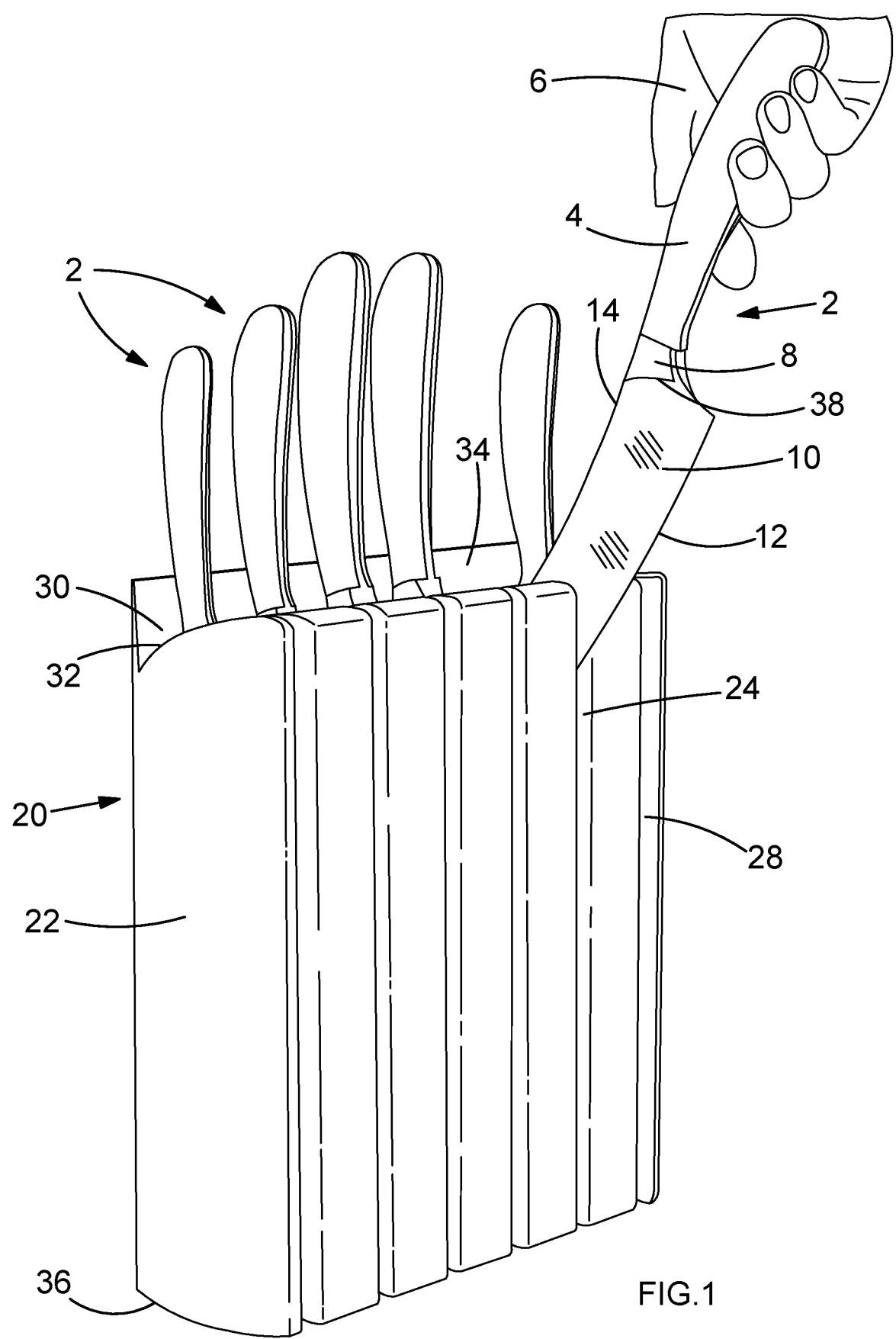
FIG. 1 is a perspective view of a knife block embodying the present invention in which a plurality of knives are mounted.

Referring to FIG. 1, the parts of a knife 2 are generally referred to as follows. The knife 2 includes a handle 4 that is adapted to be gripped by a user 6. A bolster 8 of the knife 2 is the thickened part at the end of the handle 4 which transitions to a blade 10. The blade 10 includes a cutting edge 12 and a spine 14, which is the blunt end of the knife 2 opposite to the sharp blade 12.

Figure 2:
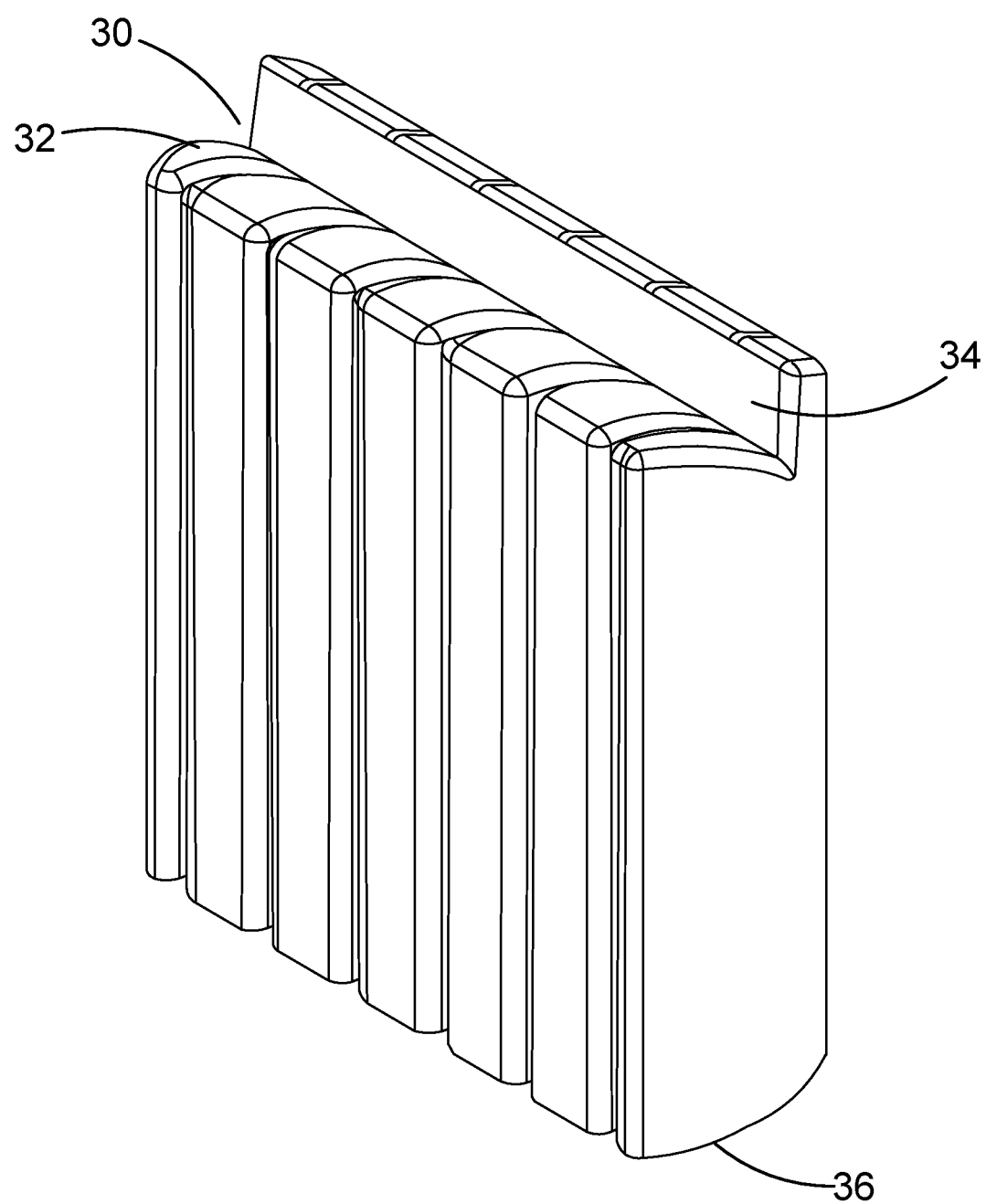
FIG. 2 is a perspective view of the knife block of FIG. 1 from the opposite side.

Referring to FIGS. 1 to 6, a knife block 20 for storing knives 2 includes a body portion 22 defining at least one slot 24 having a closed end 26 and an open end 28. A recess 30 is defined in the body portion 22. The recess 30 includes a ledge 32 defining a convex surface that is angled downwardly when the knife block 20 is in the upright condition, as shown in FIGS. 1, 2, and 6. The convex ledge 32 engages a bolster 8 of the knife 2 to direct the knife 2 against the closed end 26 of slot 24 when the knife is mounted in the slot 24.

A wall 34 extends from the closed end 26 of the slots 28. The wall 34 defines a surface against which the handles 4 and part of the spines 14 of the knives are supported when the knives are mounted in slots 24. The slots 24 extend from the base 36 of body portion 22 all the way up to the convex ledge 32. The slots 24 therefore extend the full length of the blades 10 of the knives 2. The wall 34 and the convex ledge 32 therefore define the sides of recess 30 in which a handle 4 of a knife 2 can be securely held.

The ledge 32 defines a generally convex surface that is shaped to engage concave guide surfaces 38 formed on the bolsters 8 of the knives 2. As a consequence, when a knife 2 is placed in slot 24 and moved downwardly, the concave guide surfaces 38 engage the convex ledge 32 and guide the knife into the slot 24, the spine 14 of knife 2 against the closed end 26 of the slot 24, and the handle 4 and part of the spine 14 of the blade 10 against the wall 34. In the embodiment shown, the body portion 22 is fashioned from one or more pieces of wood, although other materials and methods of construction can be used to form the body portion 22, such as plastic or metal.

To mount a knife 2 in the block 20, a user 6 guides any part of the blade 10 into a slot 24 and then moves the handle 4 downwardly such that the bolster 8, and more particularly the concave guide surfaces 38, engage the convex ledge 32. The user can then slide the knife 2 downwardly. The cooperation between the concave guide surfaces 38 and the convex ledge 32 in the recess 30 guide the spine 14 of the blade 10 against the closed end 26 of the slot 24 and the handle 4 against the wall 34. To remove the knife 2, the user 6 simply grips handle 4 and pulls the knife 3 out. In many other knife blocks, the user 6 would have to lift the knife 2 upwardly through a distance of the whole length of the blade 10, but because the slots 24 have the open ends 28 running the entire length of the blade 10, the knife 2 can be withdrawn horizontally after only a small amount of lifting to clear the recess 30.

It will be appreciated by persons skilled in the art that the above embodiment has been described by way of example only and not in any limitative sense, and that various alterations and modifications are possible without departure from the scope of the invention as defined by the appended claims.

What is claimed is:

1. A combined knife and knife block assembly comprising:
    a knife including a blade defining a length and including a bolster; and
    a knife block including:
        a body portion defining at least one slot that receives the blade of the knife, the at least one slot having a closed end and an open end extending the whole length of the blade of the knife; and
        a recess in the body portion disposed adjacent a top end of the at least one slot, wherein the recess includes a ledge defining a convex surface that is angled downwardly when the knife block is in an upright condition and engages the bolster of the knife and directs the knife against the closed end of the at least one slot.

2. A combined knife and knife block assembly according to claim 1, further including a wall portion extending from the closed end of the at least one slot and engaging the handle of the knife.

3. A combined knife and knife block assembly according to claim 1, wherein the body portion further includes a base end on which the knife block is configured to stand, and wherein the open end of the at least one slot extends from the base end to the ledge.

4. A combined knife and knife block assembly according to claim 1, further including a plurality of slots for receiving a plurality of knives, wherein each slot has a closed end and an open end.

* * * * *